J. D. SHOOTS.

Assignor of three-forths interest to R. COLWELL, S. D. CONKLING, & C. E. VINTON.

Wood Boring Machine.

No. 8,155. Reissued April 2, 1878.

WITNESSES

Franck L. Durand

Wm. Galt

INVENTOR

James D. Shoots

H. Handy Swason

ATTORNEYS

N. PETERS, PHOTO-LITHOGRAPHER, WASHINGTON, D. C.

UNITED STATES PATENT OFFICE.

JAMES D. SHOOTS, OF HORSEHEADS, ASSIGNOR OF THREE-FOURTHS INTEREST TO ROBERT COLWELL AND STODDARD D. CONKLING, OF HORSEHEADS, AND CHARLES E. VINTON, OF ELMIRA, NEW YORK.

IMPROVEMENT IN WOOD-BORING MACHINES.

Specification forming part of Letters Patent No. 192,793, dated July 3, 1877; Reissue No. 8,155, dated April 2, 1878; application filed March 12, 1878.

*To all whom it may concern:*

Be it known that I, JAMES D. SHOOTS, of Horseheads, in the county of Chemung and State of New York, have invented certain new and useful Improvements in Boring-Machines; and I do hereby declare that the following is a full, clear, and exact description thereof, reference being had to the accompanying drawings, and to the letters of reference marked thereon, which form a part of this specification.

The nature of my invention consists in the construction and arrangement of a machine for boring and reaming logs for pump-stocks or other purposes, as will be hereinafter more fully set forth.

In order to enable others skilled in the art to which my invention appertains to make and use the same, I will now proceed to describe its construction and operation, referring to the annexed drawing, in which—

Figure 1:
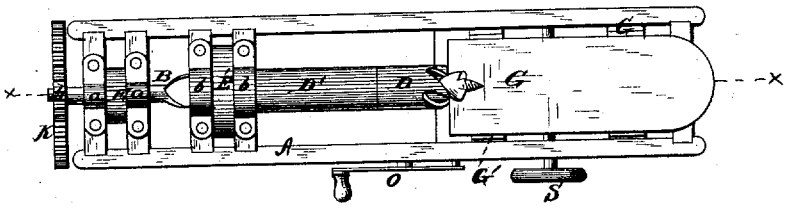
Figure 2:
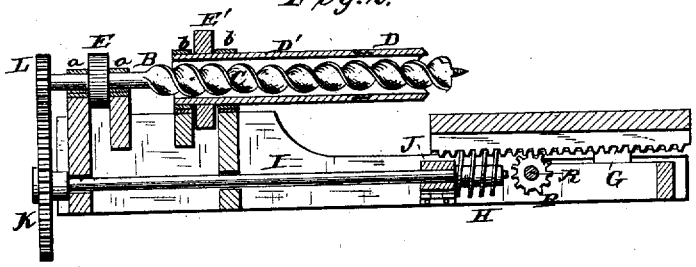

Figure 1 is a plan view of my machine. Fig. 2 is a longitudinal vertical section of the same through the line *x x*, Fig. 1.

A represents the frame-work, constructed in any suitable manner to receive the various working parts of the machine. In suitable boxes *a a* on this frame is placed the shank B of the auger C, said shank being, between said boxes or bearings, provided with a driving-pulley, E, as shown. In other bearings, *b b*, on the frame is placed the reamer, which surrounds the auger, as shown, and which is intended to ream out the log and form a conveyer for the chips cut by the auger and reamer. This reamer is made in two parts, D and D′, the rear part D′ being simply a tube or sleeve of cast-iron or other suitable metal, while the part D is made of steel and forms the reamer proper. The part D is united to the part D′ by screw-threads, as shown in Fig. 2, and the joint so made that the outer surface of the reamer will be perfectly smooth and even. The auger C projects a suitable distance beyond the end of the reamer, and both are rotated in the same or in different directions; or the auger alone may be rotated and the sleeve or case may be stationary.

The reamer is provided with a driving-pulley, E′, of twice the size of the pulley E for the auger, so that, as they are both run by belts from the same shaft, the auger will be rotated twice as fast as the reamer, or about in that proportion; otherwise the auger would soon become clogged or choked; but by running the auger so much faster than the reamer the auger is enabled to carry off all the chips as fast as cut by both the auger and reamer, it being readily seen that they must all pass through the reamer to the rear end thereof, where they are discharged by the auger.

G represents the table upon which the log is laid to be bored. This table is provided with suitable legs G′, having feet on their lower ends, which ride in suitable guides or ways in the frame A. To the under side of the table G is secured a rack-bar, *d*, which takes into a worm, H, on a shaft, I, below the table and tools. This shaft extends to the rear end of the machine, and has a large cog-wheel, K, secured on its end, and this cog-wheel meshes with a smaller cog-wheel, L, secured on the end of the auger-shaft B, as shown, whereby the necessary feed-motion is obtained, the speed of such feed being regulated by the size of the wheels K and L.

It will, of course, be understood that band-wheels may be used instead of these cog-wheels, if so desired.

The outer end of the feed-shaft has a stationary bearing, while the inner end has its bearing in a hinged bar, J, which may be raised and lowered, as required, to throw the worm H in and out of gear with the rack-bar *d*. This hinged bar J is operated by means of a lever, O, which may be held in either position by a notched plate, or by any other suitable or convenient means.

For running the table back a shaft, R, with pinion P, is provided, said pinion meshing with the rack-bar *d*, and one end of the shaft provided with a hand-wheel, S.

The reamer D is formed with curved teeth, which are so turned and beveled as to throw the chips cut by them inward into the reamer, to be carried out by the auger, as above stated.

The steel part D of the reamer may be made a trifle larger than the tube D′, to prevent binding as it passes into the log.

I am aware of the patent to Wyckoff and Morrison, No. 13,606, and disclaim the construction therein shown and described.

Having thus fully described my invention, what I claim as new, and desire to secure by Letters Patent, is—

1. In a machine for boring logs, an auger, C, revolving inside of a revolving sleeve or case, and projecting beyond the same, substantially as herein set forth.

2. In a machine for boring logs, an auger, C, revolving inside of a sleeve or case, D′, said sleeve being provided with a reamer, D, and the auger projecting beyond the sleeve and reamer, substantially as herein set forth.

3. The combination, with the table G, provided with rack-bar *d*, of the feed-shaft I, run from the auger-shaft, the worm H, secured on said shaft, and the hinged bar J, with lever O, for throwing the worm in and out of gear, substantially as and for the purposes herein set forth.

In testimony that I claim the foregoing I have hereunto set my hand this 18th day of February, 1878.

JAMES D. SHOOTS.

Witnesses:
JOHN BENNETT,
E. R. BENEDICT.